United States Patent
Sarin

(10) Patent No.: US 11,250,430 B2
(45) Date of Patent: Feb. 15, 2022

(54) SYSTEMS AND METHODS FOR AUTOMATED TRANSACTION MANAGEMENT

(71) Applicant: PAYPAL, INC., San Jose, CA (US)

(72) Inventor: Pankaj Sarin, Elkhorn, NE (US)

(73) Assignee: PayPal, Inc., San Jose, CA (US)

( * ) Notice: Subject to any disclaimer, the term of this patent is extended or adjusted under 35 U.S.C. 154(b) by 445 days.

(21) Appl. No.: 16/024,129

(22) Filed: Jun. 29, 2018

(65) Prior Publication Data

US 2020/0005320 A1    Jan. 2, 2020

(51) Int. Cl.
*G06Q 20/40* (2012.01)
*G06Q 20/10* (2012.01)

(52) U.S. Cl.
CPC ... *G06Q 20/40145* (2013.01); *G06Q 20/4016* (2013.01)

(58) Field of Classification Search
CPC .............. G06Q 20/40145; G06Q 20/4016
USPC ........................................................ 705/44
See application file for complete search history.

(56) References Cited

U.S. PATENT DOCUMENTS

| | | | |
|---|---|---|---|
| 9,635,167 B2 | 4/2017 | Todasco | |
| 9,798,385 B1* | 10/2017 | Das | A61B 5/4824 |
| 2014/0229370 A1* | 8/2014 | Yu | G06Q 20/102 |
| | | | 705/39 |
| 2014/0316988 A1* | 10/2014 | Nosek | G06Q 40/00 |
| | | | 705/44 |

OTHER PUBLICATIONS

Dialog NPL Search Results, Apr. 20, 2021 (Year: 2021).*
Dialog NPL Search Report Listing, dated Sep. 30, 2021. (Year: 2021).*

* cited by examiner

*Primary Examiner* — Hai Tran
(74) *Attorney, Agent, or Firm* — Haynes and Boone, LLP

(57) ABSTRACT

Systems and methods for transaction management include receiving, from a user device associated with a user, a transaction request and receiving, through a network in a token form, user information associated with the user while the user is accessing transaction information from the user device. The user information comprises data associated with an action by user or a biometric of the user captured by the user device. Based on data associated with the transaction request, a delay in processing the transaction request due to a transaction rule is determined, and then based on the user information, a user interaction indicator associated with the transaction is determined. A transaction management action associated with the transaction is performed based on the user interaction indicator.

20 Claims, 15 Drawing Sheets

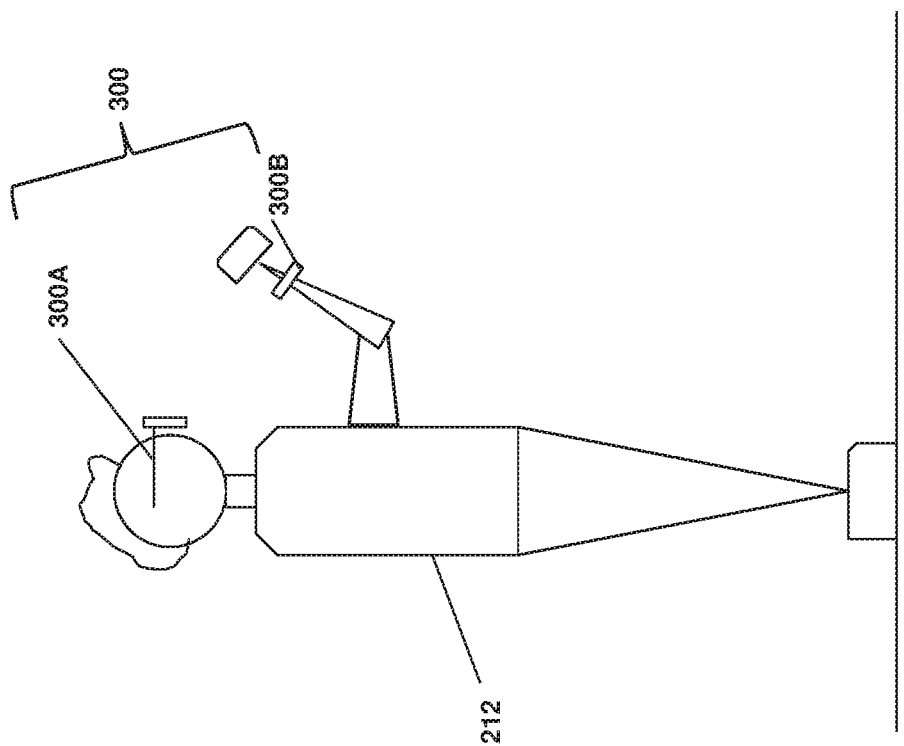

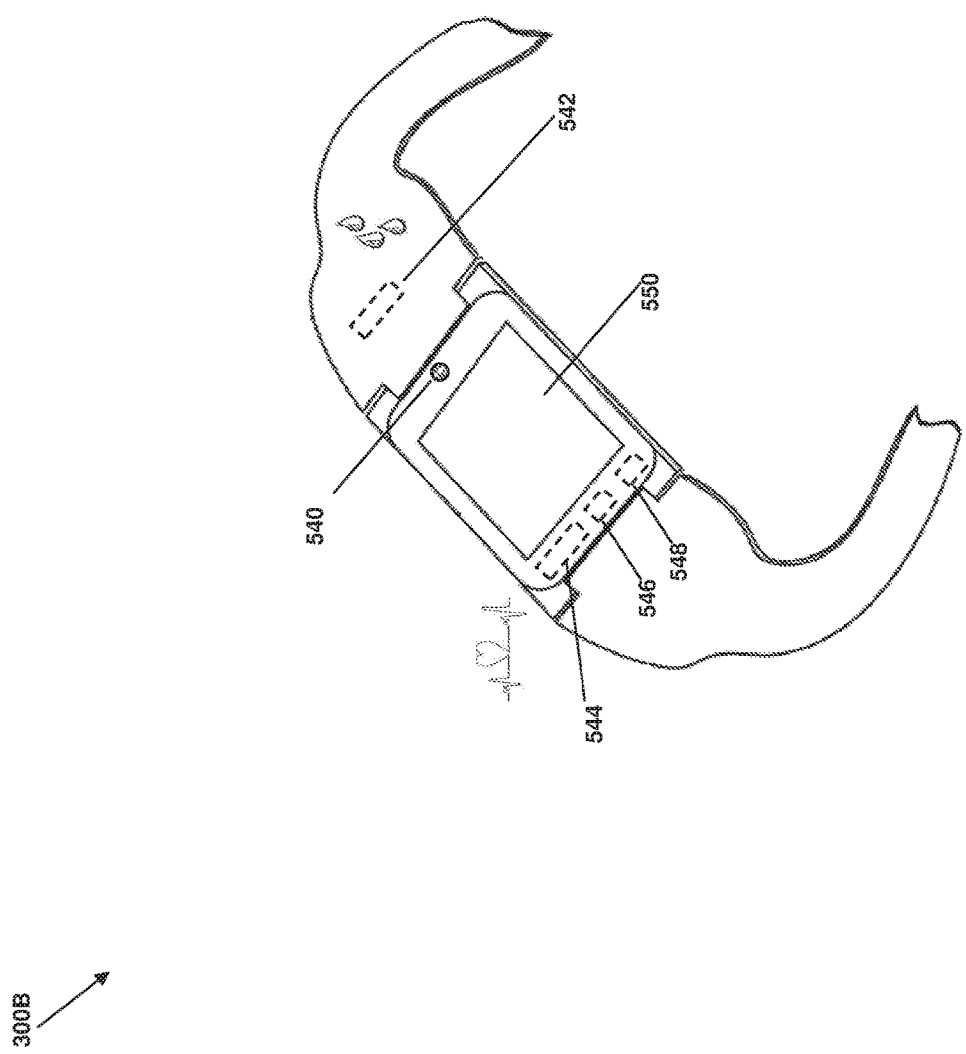

USER INTERACTION INDICATOR CONFIGURATION 604

USER INTERACTION INDICATOR CONFIGURATION OF JOHN DOE 212

| | USER INTERACTION INDICATOR CRITERIA 612 | | | USER INTERACTION INDICATOR 614 |
|---|---|---|---|---|
| TOTAL NUMBER OF ACCESS DURING 1 HOUR 616 | DEVICE SURFACE GESTURE 618 | FACIAL EXPRESSION 620 | WAIT TIME 622 | |
| >=8 | > HIGH PRESSURE THRESHOLD | SAD | > AVERAGE PRE-CONTACT WAIT TIME | HIGH |
| BETWEEN 5 and 8 | <HIGH PRESSURE THRESHOLD | FROWN | < AVERAGE PRE-CONTACT WAIT TIME | MEDIUM |
| <5 | <HIGH PRESSURE THRESHOLD | SMILE | < AVERAGE PRE-CONTACT WAIT TIME | LOW |

← 606
← 608
← 610

SYSTEM PROVIDER DEVICE 600

FIGURE 6

TRANSACTION MANAGEMENT CONFIGURATIONS 702

| USER INTERACTION INDICATOR 710 | TRANSACTION RISK 712 | TRANSACTION MANAGEMENT ACTION 714 |
|---|---|---|
| HIGH | HIGH | A FIRST REMEDIATION STEP (E.G., REDUCING HOLD TIME/TRANSACTION DELAY TIME BY FIVE HOURS) AND SEND NOTIFICATION TO USER DEVICE REGARDING THE FIRST REMEDIATION STEP |
|  | LOW | RELEASE THE HOLD AND SEND USER NOTIFICATION ABOUT THE RELEASE |
| MEDIUM | HIGH | A SECOND REMEDIATION STEP (E.G., REDUCING HOLD TIME/TRANSACTION DELAY TIME BY THREE HOURS) AND SEND NOTIFICATION TO USER DEVICE REGARDING THE SECOND REMEDIATION STEP |
|  | LOW | RELEASE THE HOLD AND SEND USER NOTIFICATION ABOUT THE RELEASE |
| LOW | LOW/HIGH | LOCATION OUT OF PHONE/TEXT RANGE: IN-APP NOTIFICATIONS WITH A THIRD REMEDIATION STEP / LOCATION WITHIN PHONE/TEXTING RANGE: NOTIFICATIONS WITH A THIRD REMEDIATION STEP |

SYSTEM PROVIDER DEVICE 600

FIGURE 7

SYSTEMS AND METHODS FOR AUTOMATED TRANSACTION MANAGEMENT

BACKGROUND

The present disclosure generally relates to transaction management, and more particularly to automating actions associated with electronic transactions by predictions based on using user information, according to various embodiments.

More and more consumers are conducting transactions, such as viewing content, communicating data, and purchasing items and services, over electronic networks such as, for example, the Internet. Such transactions can be processed between a consumer and an entity or individual through a service provider. The service provider typically receives data from a computing device from the consumer and/or the other party. However, during the transaction, an issue may arise to delays completion of the transaction, which may result in the consumer contacting the service provider for details associated with the delay(s). This can result in additional input needed by consumers and additional processing needed by the service provider, resulting in longer transaction processing times and inconvenience to consumers.

Thus, there is a need for an improved transaction management system to provide improved overall customer experience.

BRIEF DESCRIPTION OF THE FIGURES

FIG. 4 is a schematic illustrating an embodiment of a user using one or more user devices in accordance with an embodiment;

FIG. 5B is a schematic illustrating an embodiment of a user device in accordance with an embodiment;

FIG. 6 is a screen shot illustrating a system provider device displaying a transaction history information screen in accordance with an embodiment;

FIG. 7 is a screen shot illustrating a system provider device displaying a transaction management configurations screen in accordance with an embodiment;

Figure 1:
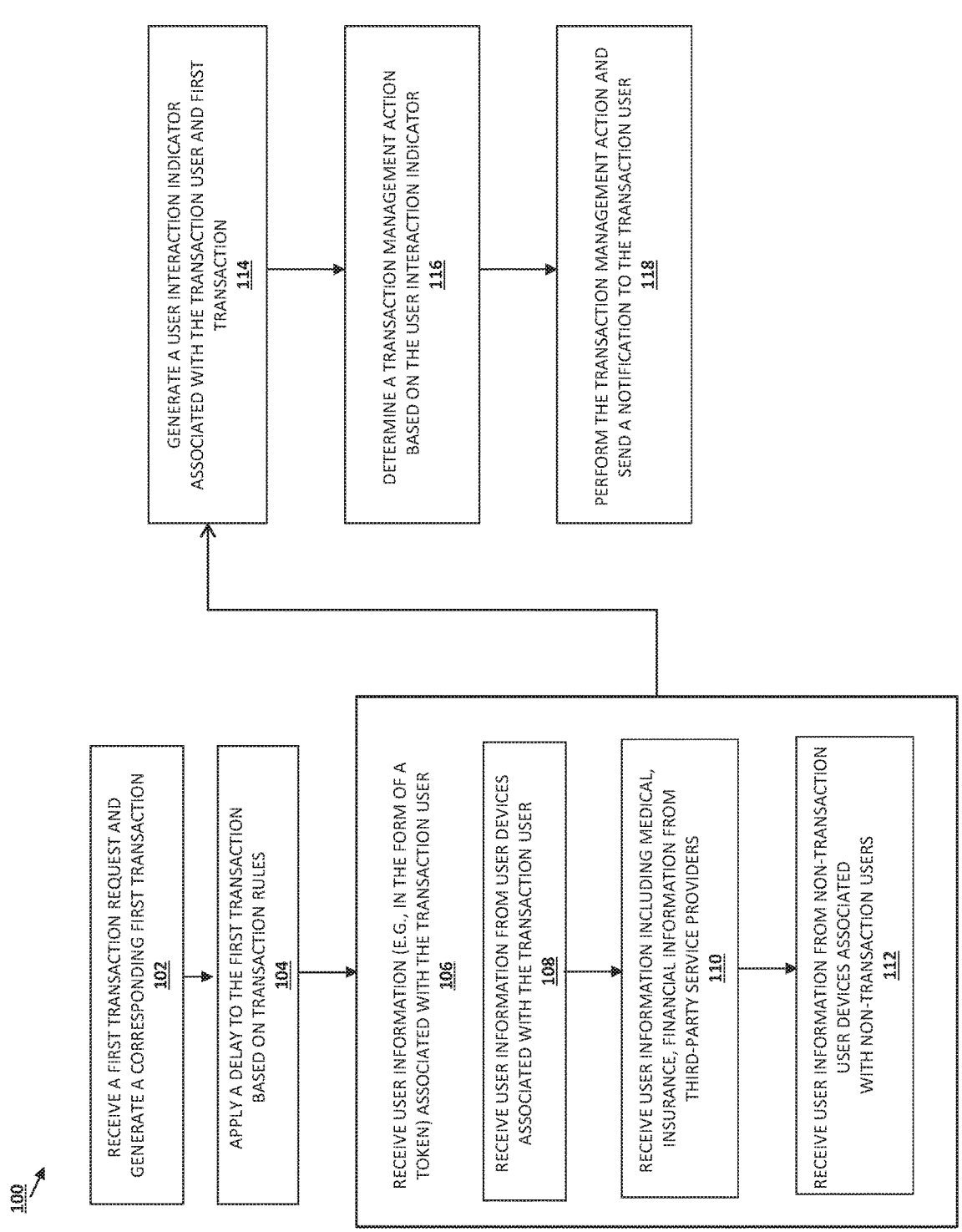
FIG. 1 is a flow chart illustrating an embodiment of a method for transaction management.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes systems and methods for transaction management for transactions conducted through one or more user devices. Various user devices may be used by a user to perform various tasks such as, for example, transferring funds, taking an online course, playing computer games, reading news/blogs, shopping, and/or performing any other suitable online transactions. In some embodiments, the transaction may be put on-hold by a service provider processing the online transaction, for example, based on transactions rules including risk rules, which may result in the user contacting the service provider to inquire about or address the hold or delay.

In one embodiment, the service provider may process data captured from the user device to predict and automate a response or action so that the service provider can address the hold or delay prior to the user initiating a communication. A user device may be configured to capture user information (also referred to as user data) while the user is accessing transaction information from the user device. The data may include facial information (e.g., smile, scowl, frown, eye size and shape, yawn, any other suitable emotion, and/or a combination thereof) of the user, gesture information detected on user device surfaces (e.g., a finger quantum and a tap pressure on a touch-sensitive surface of the user devices), audio information, body measurement data associated with measurements of the user's physical attributes or body functions (e.g., heart rate, temperature, perspiration rate). In some embodiments, the data can also include financial information, insurance information, medical information, and/or social media information, which may be provided by the user or from third-party service providers (e.g., a financial information service provider, an insurance information provider, a medical information provider, and/or a social media information provider).

The data may be sent to a transaction system provider device associated with the service provider (e.g., in a form of a digital or electronic token, Binary Large Object (BLOB), intelligent data, and/or a combination thereof) for transaction management, where the transaction system provider device may analyze the data to determine a user interaction indicator associated with the transaction that predicts a likelihood the user will contact the service provider about the transaction. The service provider may determine a transaction management action (e.g., one or more remediation steps, a release action for releasing the transaction, an adjustment action to adjust the on-hold time, sending a message to the user device) based on the user interaction indicator. The transaction management action may also be determined based on various interaction factors including for example, the total number of access times (e.g., the total number that the first transaction is accessed on the same or multiple user devices by the user), the location of the user devices, and information from devices of other users associated with the particular user of the transaction. By automatically performing transaction management actions by the system provider device based on the user interaction indicator, customer contacts to customer service channels (e.g., via emails and/or phone calls) may be reduced, which results in increased customer satisfaction and reduced operational costs (e.g., human and/or infrastructure costs) for customer service.

Figure 2:
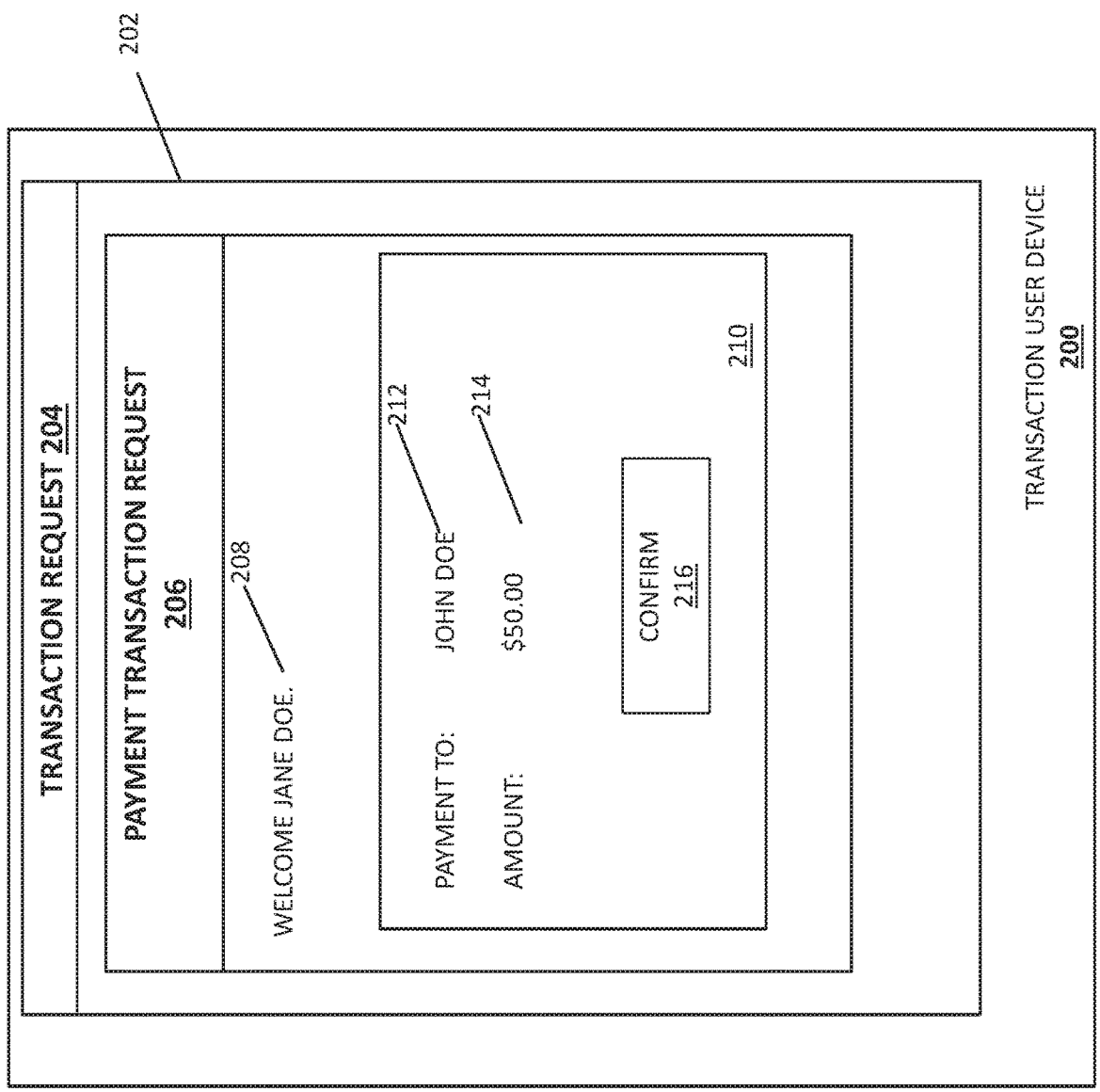
FIG. 2 is a screen shot illustrating a transaction user device displaying a transaction request screen in accordance with an embodiment.

Referring to FIG. 1, an embodiment of a method 100 for providing transaction management is illustrated. Referring to FIGS. 1 and 2, the method may begin at block 102, where a system provider device receives a first transaction request associated with one or more transaction users, and generates a first transaction based on the first transaction request.

Referring to FIG. 2, an embodiment of a transaction user device displaying a transaction request screen is illustrated. As illustrated in FIG. 2, a transaction user device 200 (also referred to as a payor device 200) of a transaction user (a payor) of a payment transaction includes a display 202 displaying a transaction request screen 204. The transaction request screen 204 displays a first transaction request 206. In the example of FIG. 2, the first transaction request 206 is a payment transaction request, and is also referred to as a payment transaction request 206. The payment transaction request 206 includes a payor identifier for a payor 208 (e.g., the payor "JANE DOE") and payment transaction request inputs 210. The payor 208 may use the payment transaction request inputs 210 to provide payment transaction request information. In the example of FIG. 2, the payment transaction request inputs 210 include a user identifier for a transaction user 212 (e.g., the payee "JOHN DOE"), and a payment amount 214 (e.g., "$50.00"). The payor 208 may select a confirmation button 216 to confirm the payment transaction request. At block 102, the system provider device receives the first transaction request (e.g., payment transaction request 206) after the payor 208 selects the confirmation button 216, and generates a corresponding first transaction (e.g., a payment transaction) based on the first transaction request.

It is noted that while payment transactions are used as an example of transactions, the method 100 may be provided to any online transactions including for example, transactions for taking an online course, playing computer games, viewing digital content such as news/blogs, shopping, and/or any other suitable online transactions that may be put on hold. The method 100 may also be provided to other user requests associated with a system provider device, including for example, transaction disputes.

The method 100 may then proceed to block 104, where the system provider device applies a delay to the first transaction associated with the first transaction request. The delay may be determined based on various transaction rules using transaction properties including for example, transaction user properties (e.g., financial status of payor and/or payee), transaction history associated with one or more transaction users, transaction amounts, transaction types, and any other suitable transaction properties. In some embodiments, the transaction rules include a transaction risk rule that may be used to generate or determine a transaction risk associated with the first transaction request based on the transaction properties. In an example, a greater transaction risk corresponds to a greater transaction amount. In some embodiments, the delay to the transaction request may be determined based on the transaction risk. For example, a longer delay is applied to a transaction request with a greater transaction risk.

Figure 3A:
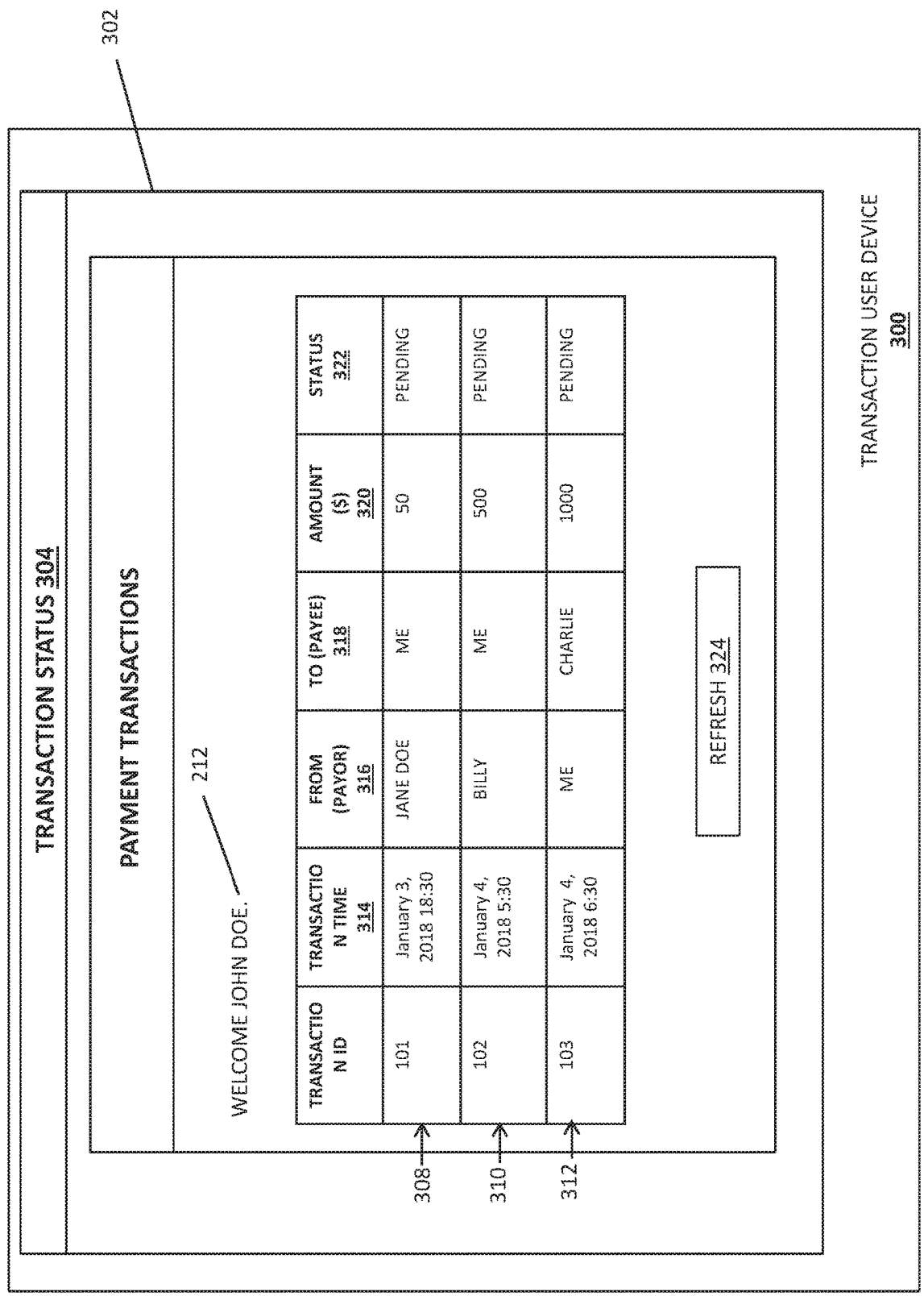
FIG. 3A is a screen shot illustrating another transaction user device displaying a transaction status screen in accordance with an embodiment.
Figure 3B:
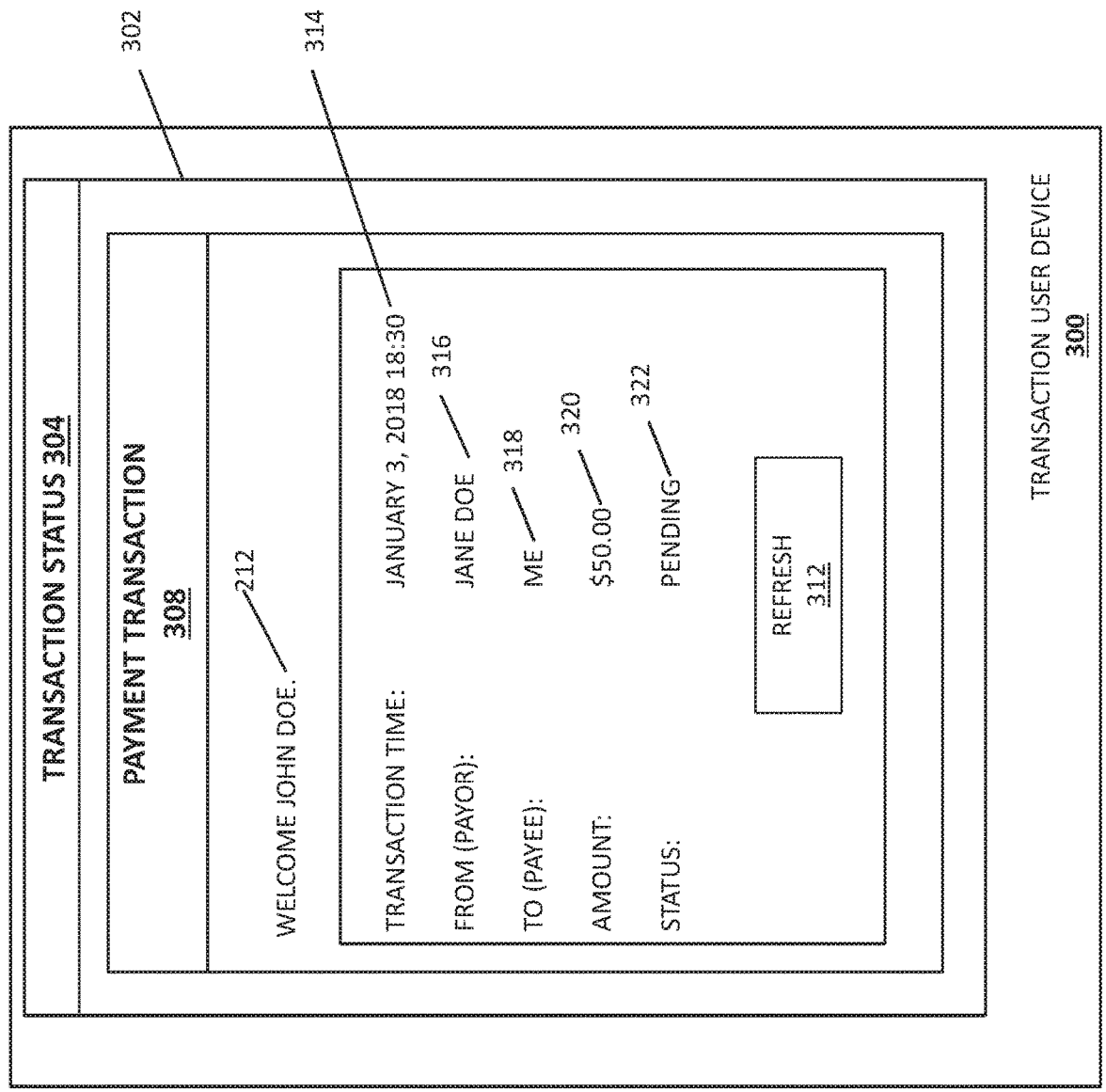
FIG. 3B is a screen shot illustrating the transaction user device displaying another transaction status screen in accordance with an embodiment.

Referring to FIGS. 1, 3A, and 3B, in some embodiments, during the delay period of the first transaction request, the system provider device put the first transaction on hold, and may have a corresponding transaction status (e.g., "pending"/"on hold"). In some embodiments, as illustrated in the example of FIG. 3A, a particular transaction user (e.g., a payee or a payor of a payment transaction) may check the status of a plurality of transactions associated with that transaction user. In some embodiments, as illustrated in the example of FIG. 3B, a particular transaction user (e.g., a payee or a payor of a payment transaction) may check the status of a particular transaction associated with that transaction user.

Referring to FIG. 3A, an embodiment of a transaction user device displaying a transaction status screen is illustrated. As illustrated in FIG. 3A, a transaction user device 300 of a transaction user 212 of a payment transaction includes a display 302 displaying a transaction status screen 304. The transaction status screen 304 displays a payee identifier for a transaction user 212 (e.g., "JOHN DOE") and information of a plurality of payment transactions 308, 310, and 312 (e.g., generated by the system provider device after receiving corresponding payment transaction requests), each with a status 322 of "PENDING." Each of the payment transactions 308, 310, and 312 includes a transaction time 314, payor information 316, payee information 318, amount information 320, and status information 322. Payment transactions 308 and 310 provide that the transaction user 212 is the payee and have payment amounts 320 of "$50" and "$500" respectively. Payment transaction 312 indicates the transaction user 212 is the payor and has a payment amount 320 of "$1000." The transaction status screen 304 includes a refresh button 312. The transaction user 212 may select the refresh button 324 to update the payment transactions and the properties (e.g., status 322) thereof.

Referring to FIG. 3B, the transaction status screen 304 may display information of a single payment transaction, for example, payment transaction 308 on which the transaction user 212 is tracking status. The transaction user 212 may select a refresh button 324 to update the transaction status 322 of the particular payment transaction 308.

The method 100 may then proceed to block 106, where the system provider device may receive user information (e.g., in the form of a digital or electronic token, Binary Large Object (BLOB), intelligent data, and/or a combination thereof) associated with one or more transaction users (e.g., payor and/or payee) of the first transaction. In an example, the digital token may include information of a user's account identifier, a transaction identifier, user information, and/or any other transaction meta data. In another example, the digital token may include various states (e.g., "Completed," "Pending," etc.) of the transaction. In yet another example, the digital token may include a timestamp and other time governed information. As shown in blocks 108, 110, and 112, in various embodiments, the user information may be provided by a transaction user device associated with a transaction user, by a third-party service provider device, by a non-transaction user device associated with a non-transaction user, and/or by any other suitable devices.

Figure 5A:
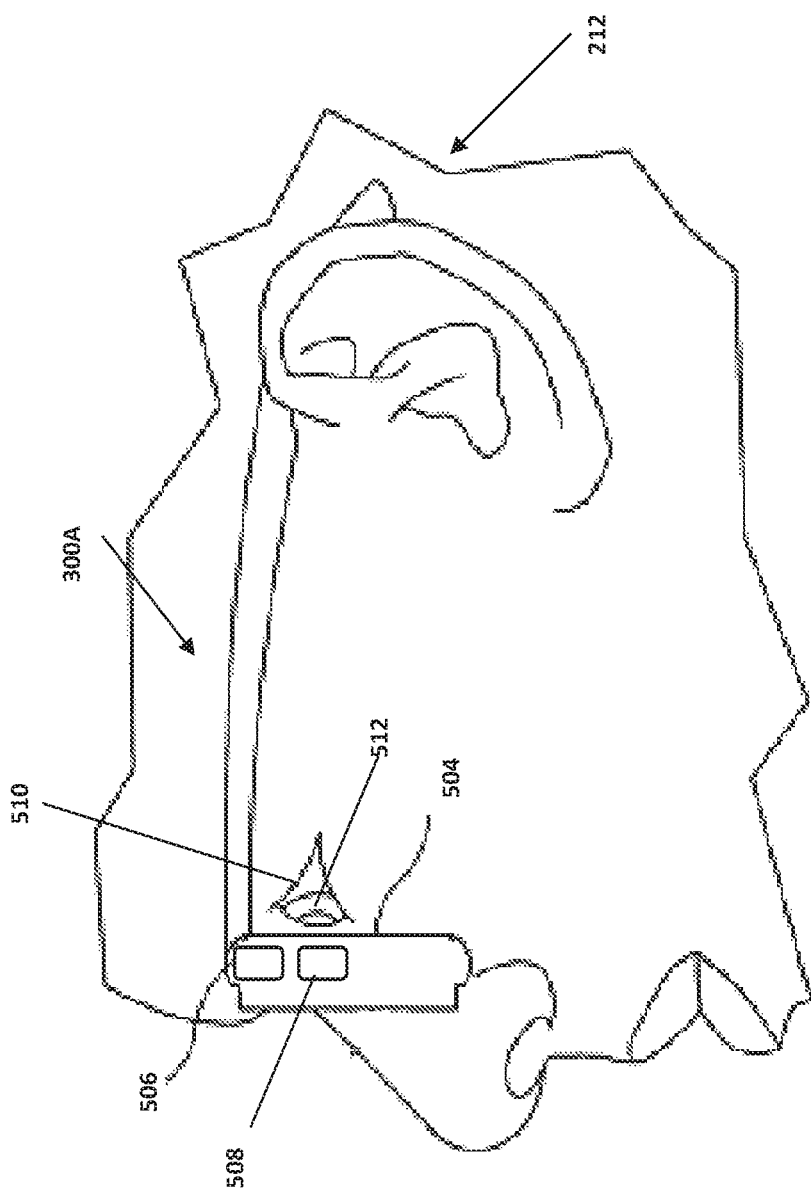
FIG. 5A is a schematic illustrating an embodiment of a user device in accordance with an embodiment.

In some embodiments, as shown in block 108, the user information is provided by one or more transaction user devices associated with a transaction user. Referring to FIGS. 4, 5A, and 5B, one or more transaction user devices associated with a transaction user may be used to collect user information and send the user information to the system provider device through a network. Referring to FIG. 4, illustrated is an embodiment of a transaction user 212 viewing transaction status using one or more user devices 300. In an example, the one or more user devices 300 includes a first user device 300A that may be mounted on the head of the user 212. The first user device 300A may include a screen for displaying transactions for the user 212, and may be used to collect information associated with the user 212, which will be described in detail below with reference to FIG. 5A. In another example, the one or more user devices 300 may include a second user device 300B that may be worn on a wrist of the user 212 or any other suitable places (e.g., hands, arms). The second user device 300B may be used to collect information associated with the user 212, which will be described in detail below with reference to FIG. 5B.

Referring to FIG. 5A, illustrated is an embodiment of a user device 300A of FIG. 4 that may be positioned on the head of the user 212 (e.g., an Oculus Rift® available from Oculus VR, LLC of Menlo Park, Calif.; a Samsung Gear VR® available from Samsung Electronics Co., Let of Suwon, South Korea; an HTC Vive® available from HTC Corp. of New Taipei City, Taiwan, Google Glass® available from Google Inc. of Mountain View, Calif.; etc.). The user device 300A includes a display 504 that may be used to display various content, including e.g., transaction status, to the user 212, a camera 506 for capturing images of the user 212's face, and an infrared sensor 508 for capturing thermal images of the tear film 512 of the eye 510. In some embodiments, the user information includes facial images that may be used to determine facial information (e.g., smile, scowl, frown, eye size and shape, yawn, eye blinking rate, eye redness information, and/or any other suitable facial expression) by a digital image process engine (e.g., located in the user device and/or system provider device). In some embodiments, the user information includes eye thermal images to determine facial information including eye dryness information by analyzing temperature change and temperature distribution on the tear film 512. In some embodiments, the user information includes location information provided by a Global Positioning System (GPS) device of the user device 300A. In some embodiments, the user information includes audio sounds made by the user and captured by a microphone of the user device 300A, which may be analyzed by a speech recognition engine (e.g., located in the user device and/or system provider device) to extract transaction related information.

Referring to FIG. 5B, illustrated is a user device 300B of FIG. 4 that may be worn on the user 212's wrist (e.g., a Fitbit Charge HR Wireless Activity Wristband® available from Fitbit Inc. of San Francisco, Calif.; an Apple Watch® available from Apple Inc. of Cupertino, Calif., etc.). The user device 300B may be used to provide user information including for example, facial information, body information, perspiration data, heat rate, blood pressure, body motion information, user gesture information including for example, a finger quantum, a tap pressure, location data, any other suitable user information, and/or a combination thereof. The user device 300B includes a camera 540 that may be used to capture the user 212's facial information and/or body information, a perspiration sensor 542 that may be used to capture perspiration data of the user 212, a heart rate sensor 544 that may be used to capture a heart rate of the user 212, a blood pressure sensor 546 that may be used to capture a blood pressure of the user 212, a motion sensor 548 that may be used to capture the user 212's body motion information, and a display 550 that may be used to display various content including the transaction status to the user 212. In some embodiments, the display 550 includes a touch-sensitive surface, which may be used to capture user gesture information on the display 550. The user gesture information may include a finger quantum, a tap pressure, contact movement direction, and/or any other touch-sensitive surface contact information. The user device 300B may also include a Global Positioning System (GPS) device, a microphone, a wireless communications device, and/or any other subsystems that may be utilized to capture the user information described herein.

In some embodiments, the user information includes user access information (e.g., a total number of access times over a particular period, an average access frequency over a particular period) that the transaction user 212 accesses a transaction interface to check the transaction status by the user device 300 (e.g., using user device 300A and/or 300B). In some embodiments, as shown in the example of FIG. 3A, a transaction status screen includes a plurality of transactions. In that example, various techniques, e.g., image processing, eye tracking, and/or gaze tracking devices and techniques, may be used to determine a particular transaction whose status the transaction user is tracking. For example, an eye tracker may determine that the point of gaze of the transaction user's eyes is at transaction 308 (and/or its status 322) area of the transaction status screen 304. As such, the total number of access times of the transaction 308 is measured based on information from the eye tracker.

In some embodiments, as shown in block 110, the user information is provided by a third-party service provider device. In various embodiments, the user information may include financial information from a financial information service provider, insurance information from insurance information provider, medical information from a medical information provider, social media information from a social media information provider, an may be provided from third-party service providers, any other suitable third-party information associated with one or more of the transaction users, and/or a combination thereof.

In some embodiments, as shown in block 112, the user information is provided by a non-transaction user device associated with a non-transaction user. In an example, the user information includes audio sounds made by the transaction user captured by a non-transaction user device associated with a non-transaction user, where the non-transaction user device is located at the same location as a transaction user device (e.g., based on location data provided by the non-transaction user device and transaction user device). A speech recognition engine on the non-transaction user device and/or system provider device may analyze the audio, and extract information (e.g., complaints and/or praises about the system provider) that may be included in the user information. The audio may also be from the non-transaction user, but related to the current transaction.

As discussed in block 106 and its processes 108, 110, and 112, various types of user information may be collected and provided to the system provider device. In some embodiments, to reduce process time, improve system operating efficiency, and reduce storage costs, only a subset of the available types of user information are collected and transmitted to the system provider device. Such a subset of types of user information may be determined based on one or more transaction properties, transaction user device properties, transaction user properties, or a combination thereof. In an example, the transaction user device 300 determines that the total number of times that the transaction user 212 has accessed the first transaction 308 on the transaction user device 300 has exceeded a first threshold (e.g., 8 times in an hour). In that example, that total access number alone may be sufficient to determine a user interaction indicator (e.g., a level of "HIGH" indicating a high level of possibility that the transaction user may contact customer services), for example, based on one or more user interaction indicator configurations, which will be discussed in detail below. As such, other types of user information (e.g., facial expression, audio information, body motion information, body measurement information, third-party provided user information, non-transaction user information) may not be collected, transmitted, and/or analyzed, which improves system efficiency and saves system cost.

In some embodiments, to further reduce process time, improve system operating efficiency, and reduce storage costs, a multi-step user information collection and transmission method may be used at block 106. During a first step, a first subset of user information (e.g., user device surface gesture and a total access number of the first transaction by the transaction user) are collected and transmitted to the system provider device, which analyzes the first subset of user information. In examples where the first subset of user information is sufficient to generate or determine a user interaction indicator (e.g., based on one or more user interaction indicator configurations), block 106 is completed. Such first subset of user information may also be referred to as a primary set of user information. In examples where the first subset of user information is not sufficient to determine a user interaction indicator (e.g., based on one or more user interaction indicator configurations), a second step for collecting and transmitting a second subset of user information (e.g., audio information, user facial information, third-party provided user information, non-transaction user information) may be performed. Such second subset of user information may also be referred to as a secondary set of user information. The system provider device may then determine the user interaction indication based on the primary set of user information and secondary set of user information.

The method 100 may then proceed to block 114, where the system provider device generates or determines a user interaction indicator associated with the transaction user and first transaction based on the user information. In some embodiments, the user interaction indicator may include a likelihood level (e.g., "HIGH," "MEDIUM," or "LOW") predicting the likelihood that the transaction user will contact customer service channels (e.g., via emails and/or phones) regarding the first transaction. Note that in other embodiments, different levels of likelihood may be used, which may depend on the number of actions associated with a held transaction. For example, if the system has 10 distinct actions, the user interaction indicator may have likelihood levels ranging from 1 to 10, corresponding to each of the 10 distinct actions. Also, the user interaction indicator may indicate a level of frustration with the transaction and may not necessarily be directed to a likelihood of user communication with the service provider. By proactively performing a remediation action, user satisfaction may increase.

In various embodiments, the user interaction indicator is determined based on various types of user information or a subset thereof, including for example, body information of the transaction user (e.g., facial information, body gesture information, heart rate data, temperature data, perspiration rate data, and blood pressure data), audio information of a statement of the transaction user, location of the transaction user, gesture information received on a surface of a transaction user device (e.g., a finger quantum, a tap pressure information), a total number of times that the first transaction is accessed on same or multiple user devices, third-party provided user information (e.g., health information, insurance information, financial information, social media information), transaction history of the transaction user (e.g., user characteristics associated with past customer contact history past average wait time prior to customer contact), any other suitable user information, and/or a combination thereof.

Referring to the example of FIG. 6, in some embodiments, at block 114, the system provider device generates or determines a user interaction indicator associated with the transaction user and first transaction based on the received user information and user interaction indictor configuration associated with the transaction user. In FIG. 6, an embodiment of a system provider device 600 displaying a user interaction indicator configuration screen is illustrated. As illustrated in FIG. 6, a system provider device 600 includes a display 602 displaying a user interaction indictor configuration screen 604. The user interaction indictor configuration screen 604 displays a user identifier for a transaction user 212 (e.g., "JOHN DOE") and information of a plurality of exemplary user interaction indictor configurations 606, 608, and 610. Each of user interaction indictor configurations 606, 608, and 610 may include user information criteria 612 for the corresponding user interaction indictor 614. For example, user interaction indictor configuration 606 provides that a user interaction indictor may have a value of "HIGH" if the user information satisfies its user information criteria 612 (e.g., the total number of access of the transaction user to a particular transaction 616 is equal to or greater than 8, the device surface gesture 618 is greater than a high pressure threshold, the facial expression 620 is "SAD," and the wait time 622 (e.g., since the transaction request is placed) is greater than the average wait time of that particular transaction user prior to contact customer service).

In another example, user interaction indictor configuration 608 provides that a user interaction indictor may have a value of "MEDIUM" if the user information satisfies its user information criteria 612 (e.g., the total number of access of the transaction user to a particular transaction 616 is between 5 and 8, the device surface gesture 618 is less than a high pressure threshold, the facial expression 620 is "FROWN," and the wait time 622 (e.g., since the transaction request is placed) is less than the average wait time of that particular transaction user prior to contact customer service). Yet in another example, user interaction indictor configuration 610 provides that a user interaction indictor may have a value of "LOW" if the user information satisfies its user information criteria 612 (e.g., the total number of access of the transaction user to a particular transaction 616 is less than 8, the device surface gesture 618 is less than a high pressure threshold, the facial expression 620 is "SMILE," and the wait time 622 (e.g., since the transaction request is placed) is less than the average wait time of that particular transaction user prior to contact customer service).

The method 100 may then proceed to block 116, where the system provider device determines a transaction management action based on the user interaction indicator. Referring to the example of FIG. 7, in some embodiments, at block 116, the system provider device determines a transaction management action based on the user interaction indicator and user transaction management configurations. In FIG. 7, an embodiment of a system provider device 600 displaying a user transaction management configuration screen is illustrated. As illustrated in FIG. 7, a system provider device 600 includes a display 602 displaying a user transaction management configuration screen 702. The user transaction management configuration screen 702 displays a plurality of exemplary user transaction management configurations 704, 706, and 708. Each of user transaction management configurations 704, 706, and 708 may include the user interaction indicator 710 (e.g., determined at block 114), a transaction risk 712 associated with the first transaction, and the corresponding transaction management action 714. In some embodiments, the transaction risk 712 may be initially determined based on transaction rules. The transaction rules may be used to determine that transaction risk 712 using transaction properties (e.g., transaction amounts). For example, the transaction rules may provide that a transaction with a larger transaction amount (e.g., $1,000) has a risk (e.g., "HIGH") greater than the risk (e.g., "LOW") of another transaction with a smaller transaction amount (e.g., $100). In some embodiments, the transaction risk 712 may be updated based on the received user information (e.g., user financial information), and such updated transaction risk 712 may be used to update the delay to the transaction. For example, the transaction risk 712 may be changed from "HIGH" to "LOW" after the received user financial information indicates that the particular user has a particular amount (e.g., greater than the transaction amount) in a savings bank account.

As shown in FIG. 7, user transaction management configuration 704 provides that in an example where the user interaction indicator 710 has a value of "HIGH" and the transaction risk 712 has a value of "HIGH," the transaction management action 714 includes a first remediation step (e.g., reducing the delay time to the first transaction by five hours) and sending a notification to a transaction user device about the first remediation step. The notification may include a remediation message to the transaction user including the remaining delay time (e.g., two hours) for releasing the transaction. The user transaction management configuration 704 further provides that in an example where the user interaction indicator 710 has a value of "HIGH" and the transaction risk 712 has a value of "LOW," the transaction management action 714 includes releasing the hold on the transaction immediately and sending a notification to a transaction user device notifying the transaction user about the immediate release.

As shown in FIG. 7, user transaction management configuration 706 provides that in an example where the user interaction indicator 710 has a value of "MEDIUM" and the transaction risk 712 has a value of "HIGH," the transaction management action 714 a second remediation step (e.g., reducing the delay time to the second transaction by three hours) and sending a notification to a transaction user device about the second remediation step. The notification may include a remediation message to the transaction user including the remaining delay time for releasing the transaction. The user transaction management configuration 706 further provides that in an example where the user interaction indicator 710 has a value of "MEDIUM" and the transaction risk 712 has a value of "LOW," the transaction management action 714 includes releasing the hold on the transaction immediately and sending a notification to a transaction user device notifying the transaction user about the immediate release.

As shown in user transaction management configuration 708 of FIG. 7, in some embodiments, the transaction management action and/or the notification are determined based on a location of the transaction user device. For example, user transaction management configuration 708 provides that in an example where the user interaction indicator 710 has a value of "LOW," the transaction management action 714 may include a third remediation step (e.g., providing a detailed description of the transaction on-hold policy) and an in-app notification (e.g., push notification) to the transaction user device after determining that the user device location is out of range of the phone/text provider, e.g., beyond a predetermined geofence. This may happen, for example, when the transaction user is traveling in a foreign country and does not have international roaming. For further example, user transaction management configuration 708 provides that in an example where the user interaction indicator 710 has a value of "LOW," the transaction management action 714 may include providing a third remediation step (e.g., providing a detailed description of the transaction on-hold policy) and sending a text message or making a phone call to the transaction user device after determining that the user device location is within the range of the phone/text provider.

Figure 8:
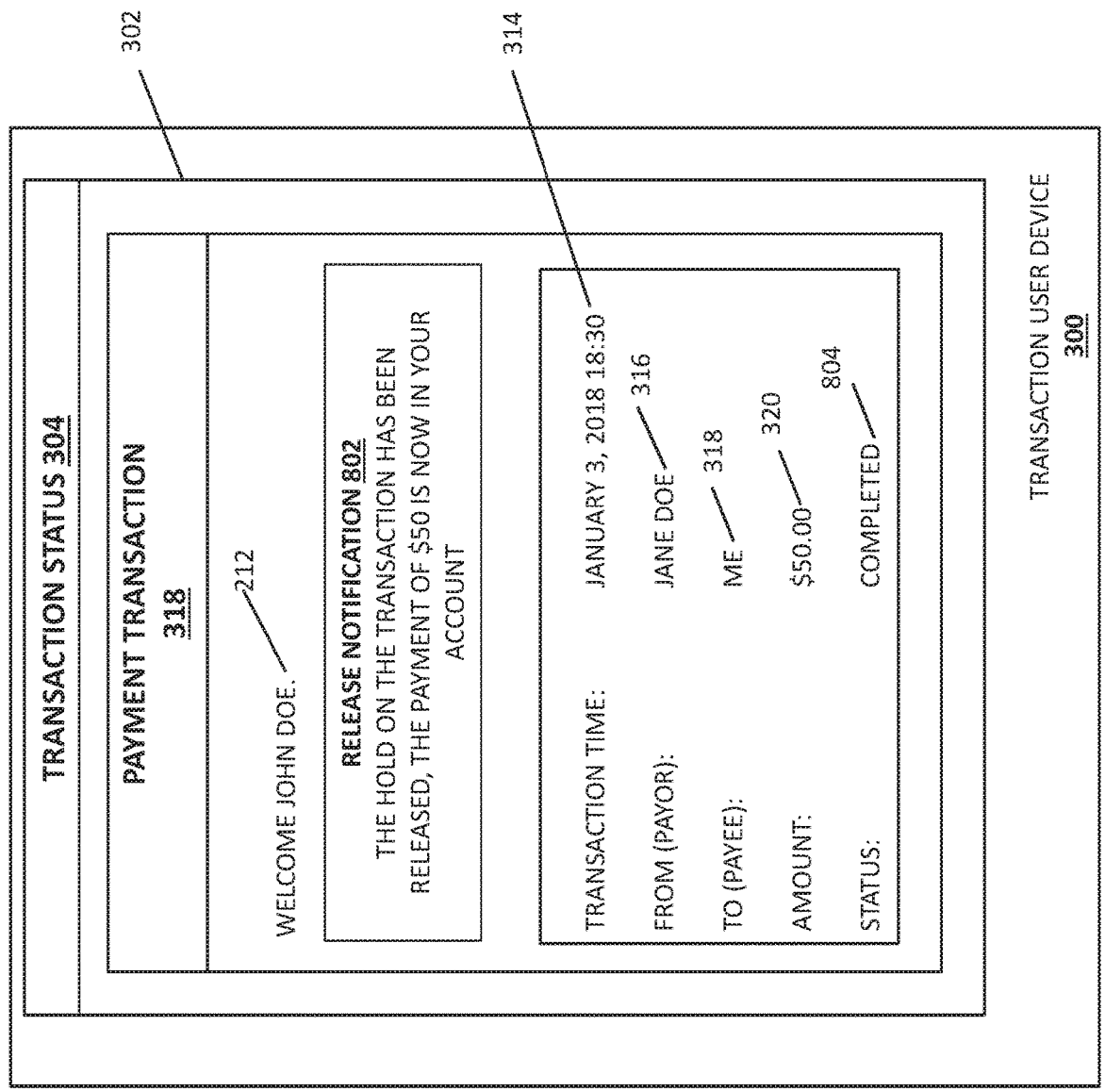
FIG. 8 is a screen shot illustrating an embodiment of a user device displaying a transaction status screen including a transaction management action notification in accordance with an embodiment.
Figure 9:
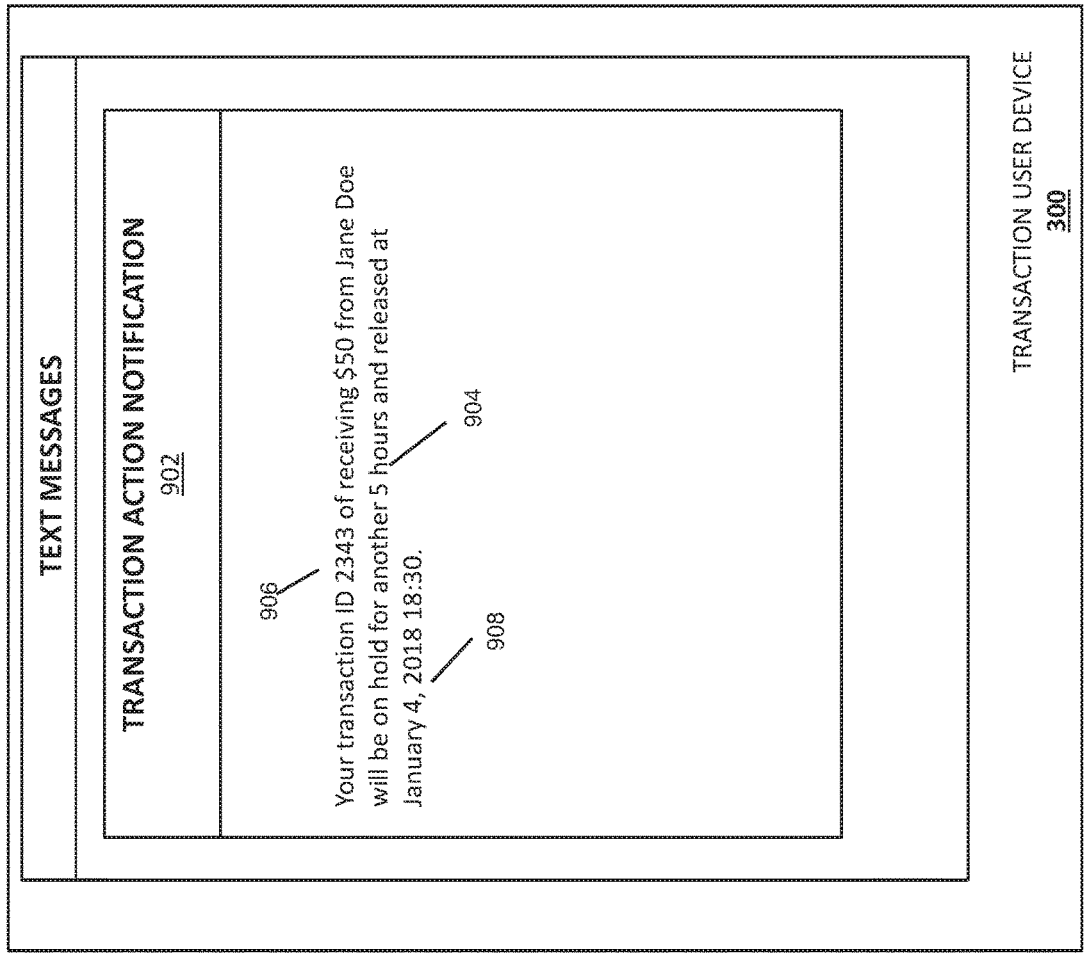
FIG. 9 is a screen shot illustrating an embodiment of a user device displaying a transaction management action notification screen in accordance with an embodiment.

The method 100 may then proceed to block 118, where the system provider device performs the transaction management action and send a notification to the transaction user. Referring to FIGS. 8 and 9, in various embodiments, after performing the transaction management action, in-app notifications and texting notifications may be sent to the transaction user device 300 (e.g., based on the location of the transaction user device 300). Referring to the example of FIG. 8, an in-app notification message 802 is sent to the transaction user device 300 (e.g., when the location of the transaction user device 300 is outside the texting service range) in the transaction status screen 304. The in-app notification message 802 includes a remediation message notifying the transaction user that the hold on the particular transaction 308 has been released. The transaction status is also updated with an updated value 804 (e.g., "COMPLETED"). Referring to the example of FIG. 9, a texting notification message 902 is sent to the transaction user device 300 (e.g., when the location of the transaction user device 300 is within the texting service range). The texting message 902 includes a remediation message notifying the transaction user that the additional on hold time 904 (e.g., five hours) of a particular transaction 906 (e.g., transaction ID 2343), and also the release time 908 (e.g., Jan. 4, 2018 18:30).

Thus, systems and methods for providing transaction management have been described that operate to provide users, system providers, and various third-party content providers a transaction management system that may adapt and automate transaction management actions according to user information. In some embodiments, a transaction may be put on-hold by a system provider device, for example, based on transactions rules including risk rules. When a transaction is detected as being delayed or put on hold, the system may process data or user information captured through a computing device of the user conducting the transaction or from other computing devices proximate to the computing device. Using that data, the system may automatically predict the user's likelihood of contacting the service provider or the user's level of frustration and determine an appropriate action based on the likelihood or level. By automatically performing transaction management actions by the system provider device based on the user interaction indicator, customer contacts to customer service channels (e.g., via emails and/or phone calls) may be reduced, which results in increased customer satisfaction and reduced operational costs (e.g., human and/or infrastructure costs) for customer service.

Figure 10:
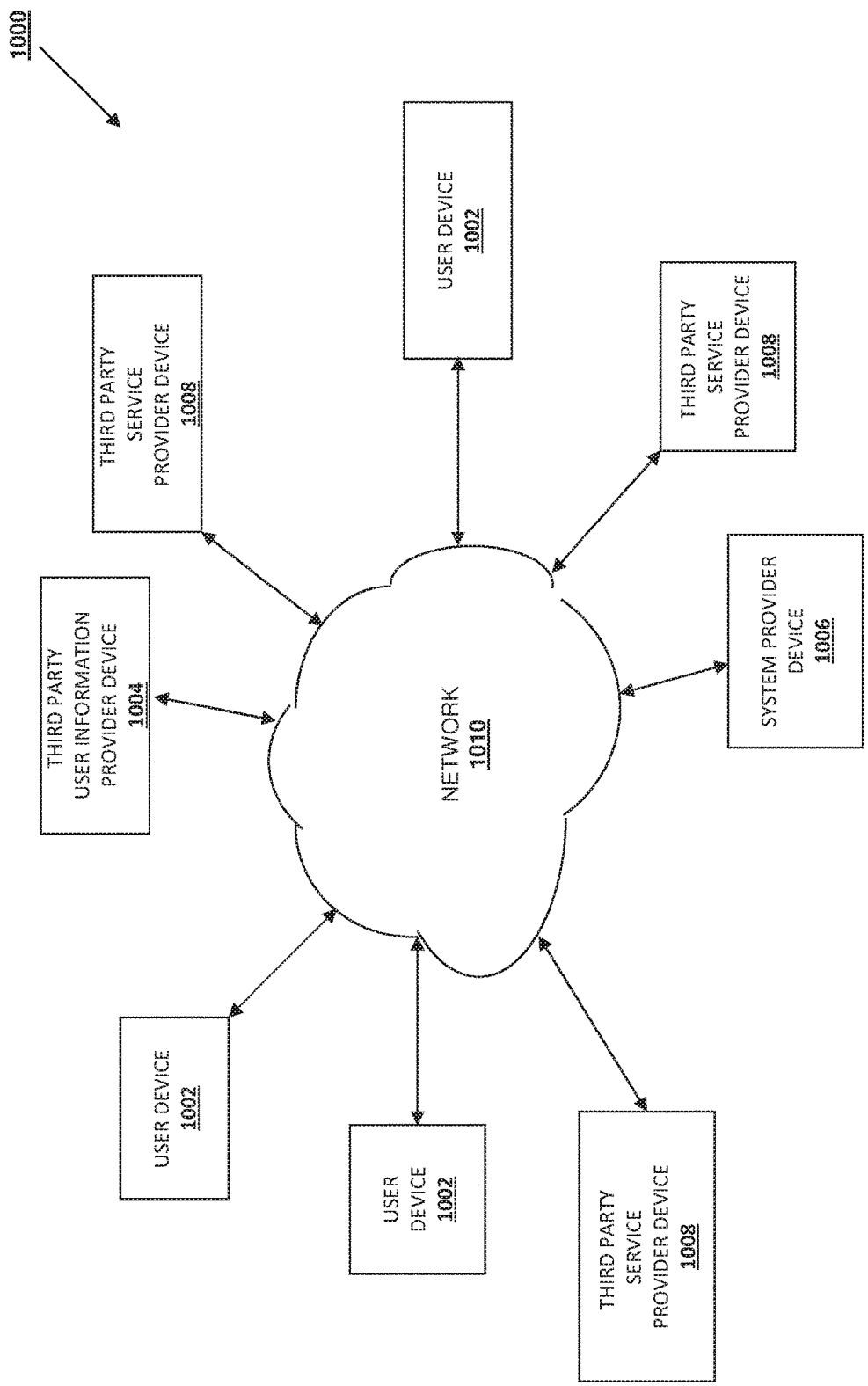
FIG. 10 is a schematic view illustrating an embodiment of a networked system.

Referring now to FIG. 10, an embodiment of a network-based system 1000 for implementing one or more processes described herein is illustrated. As shown, network-based system 1000 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 10 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 1000 illustrated in FIG. 10 includes one or more user devices 1002, one or more third party user information provider devices 1004, one or more system provider devices 1006, and one or more third party service provider devices 1008 in communication over a network 1010. Any of the user devices 1002 may be the user devices 200, 300, 300A, and 300B discussed above and used by the user discussed above. The third party user information provider device 1004 may be the user information provider device discussed above that provides financial information, medical information, insurance information, social medial information, and any other user information. The system provider device 1006 may be the system provider device 600 discussed above and may be operated by a system provider such as, for example, PayPal Inc. of San Jose, Calif. The third party service provider device 1008 may be the service provider device providing transaction services and may be operated by various service providers including payment service providers, discount providers, marketplace providers, and/or any other service providers.

The user devices 1002, third party user information provider device 1004, system provider devices 1006, and third party service provider devices 1008 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 1000, and/or accessible over the network 1010.

The network 1010 may be implemented as a single network or a combination of multiple networks. For example, in various embodiments, the network 1010 may include the Internet and/or one or more intranets, landline networks, wireless networks, and/or other appropriate types of networks.

The user device 1002 may be implemented using any appropriate combination of hardware and/or software configured for wired and/or wireless communication over network 1010. For example, in one embodiment, the user device 1002 may be implemented as a personal computer of a user in communication with the Internet. In some embodiments, the user device 1002 may be a wearable device. In some embodiments, the user device 1002 may be a smart phone, personal digital assistant (PDA), laptop computer, and/or other types of computing devices.

The user device 1002 may include one or more browser applications which may be used, for example, to provide a convenient interface to permit the customer to browse information available over the network 1010. For example, in one embodiment, the browser application may be implemented as a web browser configured to view information available over the Internet.

The user device 1002 may also include one or more toolbar applications which may be used, for example, to provide user-side processing for performing desired tasks in response to operations selected by the customer. In one embodiment, the toolbar application may display a user interface in connection with the browser application.

The user device 1002 may further include other applications as may be desired in particular embodiments to provide desired features to the user device 1002. In particular, the other applications may include an online payment transaction application provided by an online payment transaction provider. The other applications may also include security applications for implementing user-side security features, programmatic user applications for interfacing with appropriate application programming interfaces (APIs) over the network 1010, or other types of applications. Email and/or text applications may also be included, which allow the customer to send and receive emails and/or text messages through the network 1010. The user device 1002 includes one or more user and/or device identifiers which may be implemented, for example, as operating system registry entries, cookies associated with the browser application, identifiers associated with hardware of the user device 1002, or other appropriate identifiers, such as a phone number. In one embodiment, the user identifier may be used by the system provider device 1006, the third party user information provider device 1004, and/or the third party service provider device 1008 associate the user with a particular account as further described herein.

Figure 11:
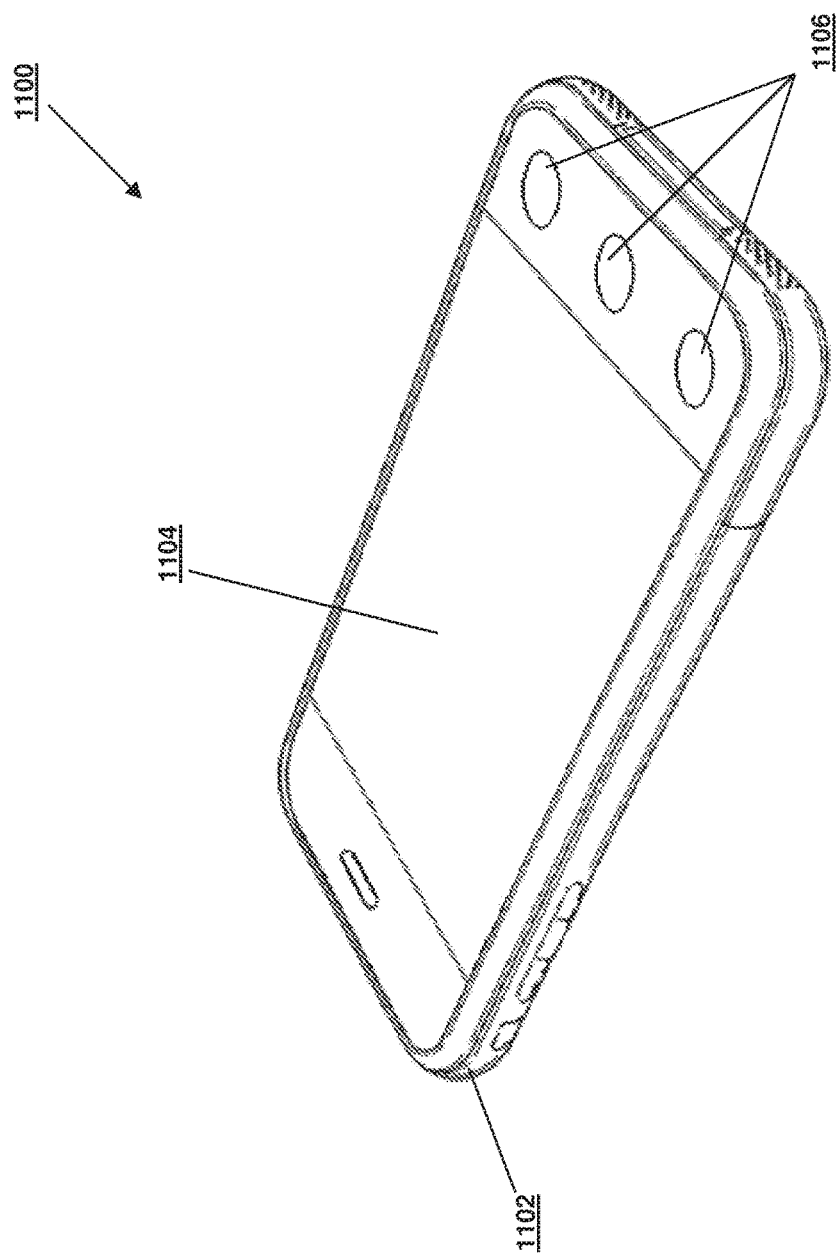
FIG. 11 is a perspective view illustrating an embodiment of a user device.

Referring now to FIG. 11, an embodiment of a user device 1100 is illustrated. The user device 1100 may be the user devices 200, 300, 300A, and 300B. The user device 1100 includes a chassis 1102 having a display 1104 and an input device including the display 1104 and a plurality of input buttons 1106. One of skill in the art will recognize that the user device 1100 is a portable or mobile phone including a touch screen input device and a plurality of input buttons that allow the functionality discussed above with reference to the method 100. However, a variety of other portable/mobile customer devices may be used in the method 100 without departing from the scope of the present disclosure.

Figure 12:
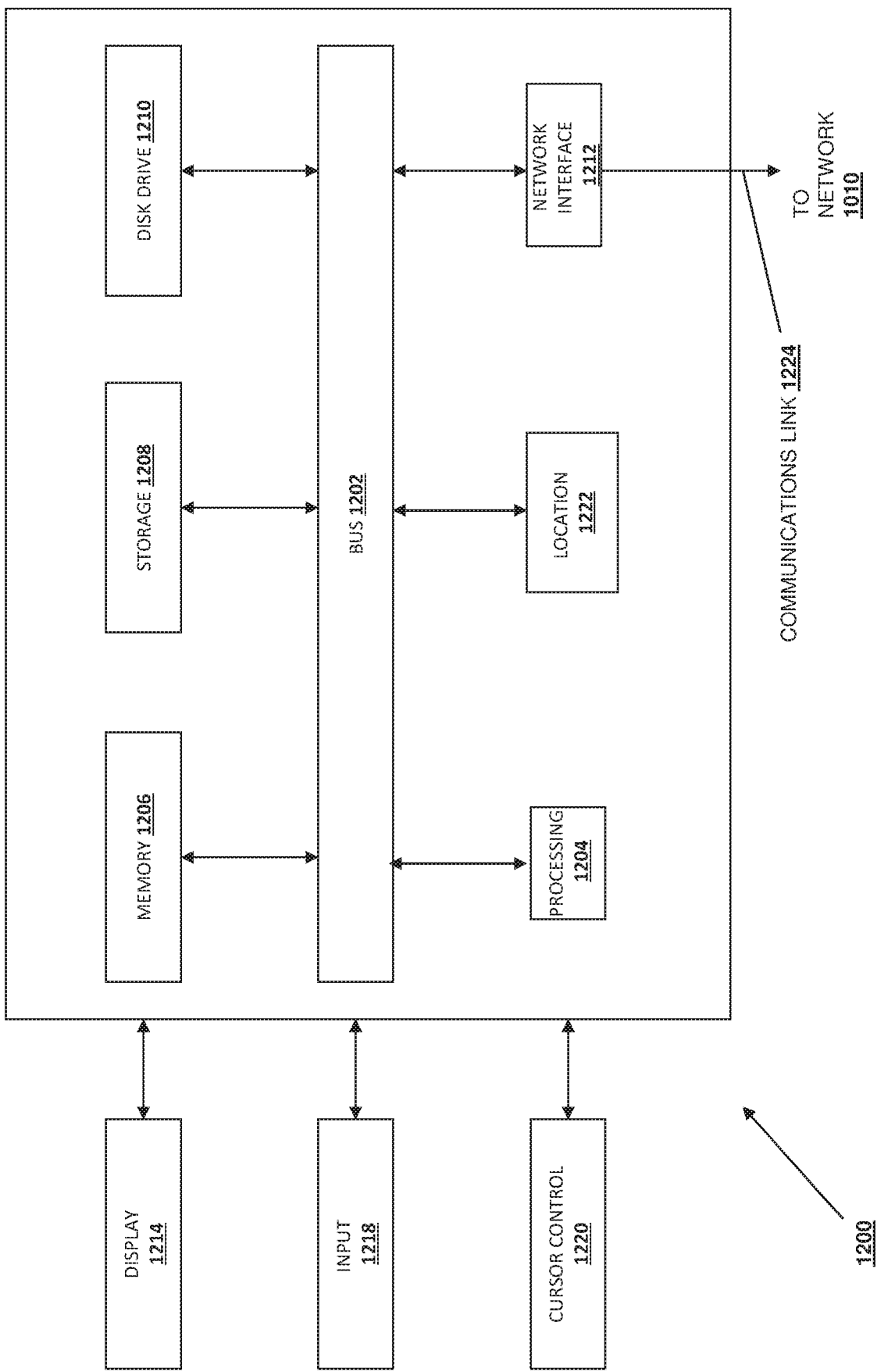
FIG. 12 is a schematic view illustrating an embodiment of a computer system.

Referring now to FIG. 12, an embodiment of a computer system 1200 suitable for implementing, for example, user devices 200, 300, 300A, and 300B, the system provider device 600, third party user information provider device 1004, and/or third party service provider device 1008 is illustrated. It should be appreciated that other devices utilized by users, system providers, third party user information providers, third party service providers, and/or system providers in the system discussed above may be implemented as the computer system 1200 in a manner as follows.

In accordance with various embodiments of the present disclosure, computer system 1200, such as a computer and/or a network server, includes a bus 1202 or other communication mechanism for communicating information, which interconnects subsystems and components, such as a processing component 1204 (e.g., processor, micro-controller, digital signal processor (DSP), etc.), a system memory component 1206 (e.g., RAM), a static storage component 1208 (e.g., ROM), a disk drive component 1210 (e.g., magnetic or optical), a network interface component 1212 (e.g., modem or Ethernet card), a display component 1214 (e.g., CRT or LCD), an input component 1218 (e.g., keyboard, keypad, or virtual keyboard), a cursor control component 1220 (e.g., mouse, pointer, or trackball), and a location sensor component 1222 (e.g., a Global Positioning System (GPS) device as illustrated, a cell tower triangulation device, and/or a variety of other location determination devices known in the art). In one implementation, the disk drive component 1210 may comprise a database having one or more disk drive components.

In accordance with embodiments of the present disclosure, the computer system 1200 performs specific operations by the processor 1204 executing one or more sequences of instructions contained in the memory component 1206, such as described herein with respect to the system provider device(s) 600, user devices 200, 300, 300A, and 300B, third party user information provider device 1004, and/or third party service provider device 1008. Such instructions may be read into the system memory component 1206 from another computer readable medium, such as the static storage component 1208 or the disk drive component 1210. In other embodiments, hard-wired circuitry may be used in place of or in combination with software instructions to implement the present disclosure.

Logic may be encoded in a computer readable medium, which may refer to any medium that participates in providing instructions to the processor 1204 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1210, volatile media includes dynamic memory, such as the system memory component 1206, and transmission media includes coaxial cables, copper wire, and fiber optics, including wires that comprise the bus 1202. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1200. In various other embodiments of the present disclosure, a plurality of the computer systems 1200 coupled by a communication link 1224 to the network 1010 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1200 may transmit and receive messages, data, information and instructions, including one or more programs (i.e., application code) through the communication link 1224 and the network interface component 1212. The network interface component 1212 may include an antenna, either separate or integrated, to enable transmission and reception via the communication link 1224. Received program code may be executed by processor 1204 as received and/or stored in disk drive component 1210 or some other non-volatile storage component for execution.

Figure 13:
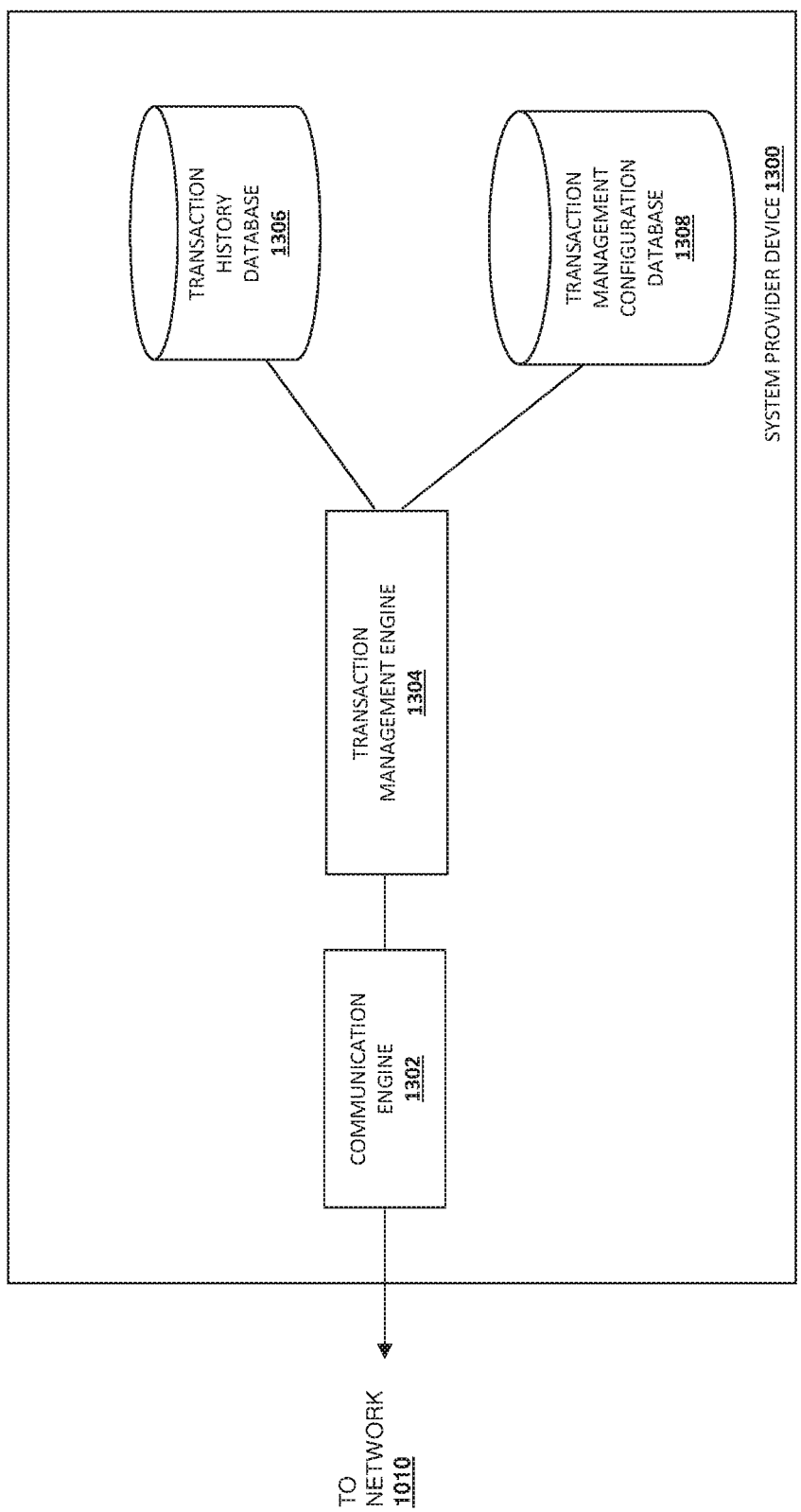
FIG. 13 is a schematic view illustrating an embodiment of a system provider device.

Referring now to FIG. 13, an embodiment of a system provider device 1300 is illustrated. In an embodiment, the system provider device 1300 may be the system provider devices 600 discussed above. The system provider device 1300 includes a communication engine 1302 that is coupled to the network 1010 and to a transaction management engine 1304 that is coupled to a transaction history database 1306 and a transaction management configuration database 1308. The communication engine 1302 may be software or instructions stored on a computer-readable medium that allows the system provider device 1300 to send and receive information over the network 1010. The transaction management engine 1304 may be software or instructions stored on a computer-readable medium that is operable to determine a first transaction associated with a user, receive, through a network in a token form, user information associated with the user while the user is accessing first transaction information from a user device, where the user information includes gesture information received on a surface of the user device, determine, using the user information, a user interaction indicator associated with the first transaction, perform a transaction management action associated with the first transaction determined based on the user interaction indicator, and provide any of the other functionality that is discussed above. While the databases 1306-1308 have been illustrated as separate from each other and located in the system provider device 1300, one of skill in the art will recognize that any or all of the databases 1306-1308 may be combined and/or may be connected to the transaction management engine 1304 through the network 1010 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
a non-transitory memory; and
one or more hardware processors coupled to the non-transitory memory and configured to read instructions from the non-transitory memory to cause the system to perform operations comprising:
receiving, from a user device associated with a user, a transaction request associated with a transaction;
determining a delay applicable to processing the transaction request based on data associated with the transaction request and a transaction rule;
delaying the processing the transaction request based on the transaction rule;
initiating, between the system and the user device, a multi-step collection and transmission process for user information associated with the user, wherein a first portion of the multi-step collection and transmission process comprises:
receiving, through a network from the user device, a first subset of the user information associated with the user while the user is accessing transaction information via a graphical user interface of the user device, wherein the first subset of the user information comprises data associated with a user action or a biometric of the user captured by the user device;
analyzing the first subset of the user information; and
based on the analysis of the first subset of the user information, determining whether the first step of the multi-step collection and transmission process is sufficient to determine a user interaction indicator associated with the delay in the processing the transaction;
in response to determining that sufficient user information has been collected and analyzed in the multi-step collection and transmission process, generating, based on the user information, the user interaction indicator associated with the delay in the processing the transaction;
determining a transaction management action to perform based on the user interaction indicator associated with the delay in the processing the transaction; and
performing the transaction management action.

2. The system of claim 1, wherein the user information comprises at least one of facial information, body gesture information, heart rate data, temperature data, perspiration rate data, blood pressure data, or audio from the user.

3. The system of claim 1, wherein the user information is in a digital token form and includes a transaction identifier of the transaction and a user identifier of the user.

4. The system of claim 1, wherein the user action is a gesture on a surface of the user device, wherein the surface is a touch-sensitive surface, and wherein the user information comprises at least one of a finger quantum or a tap pressure from the user device.

5. The system of claim 1, wherein the delay is due to an on-hold status, and wherein the transaction management action includes one of a release action or a reducing hold time action.

6. The system of claim 1, wherein the transaction management action comprises sending content about the delay to the user device.

7. The system of claim 1, wherein the operations further comprise performing a second portion of the multi-step collection and transmission process to collect a second subset of the user information in response to determining the first portion of the multi-step collection and transmission process is not sufficient to determine the user interaction indicator associated with the delay in the processing the transaction.

8. A non-transitory machine-readable medium having stored thereon machine-readable instructions executable to cause a machine to perform operations comprising:
receiving, from a user device associated with a user, a transaction request associated with a transaction;
determining a delay applicable to processing the transaction request based on data associated with the transaction request and a transaction rule;
delaying the processing the transaction request based on the transaction rule;
initiating, between the machine and the user device, a multi-step collection and transmission process for user information associated with the user, wherein a first portion of the multi-step collection and transmission process comprises:
receiving, from the user device, through a network in a token form, a first subset of the user information associated with the user and the transaction request from the user device, wherein the first subset of the user information comprises voice data of the user captured by the user device;
analyzing the first subset of the user information; and
based on the analysis of the first subset of the user information, determining whether the first portion of the multi-step collection and transmission process is sufficient to determine a user interaction indicator associated with the delay in the processing the transaction;
in response to determining that sufficient user information has been collected and analyzed in the multi-step collection and transmission process, generating, based on the user information, the user interaction indicator associated with the delay in the processing the transaction;
determining a transaction management action to perform based on the user interaction indicator associated with the delay in the processing the transaction; and
performing the transaction management action.

9. The non-transitory machine-readable medium of claim 8, wherein the transaction management action includes sending a notification to the user device.

10. The non-transitory machine-readable medium of claim 9, wherein the notification is determined based on a location of the user device, and wherein the notification is one of a text message to a phone number associated with the user, an email to an email address associated with the user, or a call to the user device over the network.

11. The non-transitory machine-readable medium of claim 8, wherein the first subset of the user information further comprises voice data associated with a second user and associated with the transaction request.

12. The non-transitory machine-readable medium of claim 8, wherein the transaction has an on-hold status associated with the delay, and wherein the transaction management action includes one of a release action or a reducing a hold-time action.

13. The non-transitory machine-readable medium of claim 12, wherein the operations further comprise performing a second portion of the multi-step collection and transmission process to collect a second subset of the user information in response to determining the first portion of the multi-step collection and transmission process is not sufficient to determine the user interaction indicator associated with the delay in the processing the transaction.

14. A method comprising:
receiving, from a user device associated with a user, a transaction request associated with a transaction;
determining a delay applicable to processing the transaction request based on data associated with the transaction request and a transaction rule;
delaying the processing the transaction request based on the transaction rule;
initiating, with the user device, a multi-step collection and transmission process for user information associated with the user, wherein a first portion of the multi-step collection and transmission process comprises:
receiving, from the user device through a network, a first subset of the user information associated with the user while the user is accessing transaction information via a graphical user interface of the user device, wherein the first subset of the user information comprises data associated with a user action or a biometric of the user captured by the user device;
analyzing the first subset of the user information; and
based on the analysis of the first subset of the user information, determining whether the first portion of the multi-step collection and transmission process is sufficient to determine a user interaction indicator associated with the delay in the processing the transaction;
in response to determining that sufficient user information has been collected and analyzed in the multi-step collection and transmission process, generating, based on the user information, the user interaction indicator associated with the delay in the processing the transaction;
determining a transaction management action to perform based on the user interaction indicator associated with the delay in the processing the transaction; and
performing the transaction management action.

15. The method of claim 14, wherein the user information comprises at least one of facial information, body gesture information, heart rate data, temperature data, perspiration rate data, blood pressure data, or audio from the user.

16. The method of claim 14, wherein the user information is in a digital token form and includes a transaction identifier of the transaction and a user identifier of the user.

17. The method of claim 14, wherein the user action is a gesture on a surface of the user device, wherein the surface is a touch-sensitive surface, and wherein the user information comprises at least one of a finger quantum or a tap pressure from the user device.

18. The method of claim 14, wherein the delay is due to an on-hold status, and wherein the transaction management action includes one of a release action or a reducing a hold-time action.

19. The method of claim 14, wherein the transaction management action comprises sending content about the delay to the user device.

20. The method of claim 14, further comprising performing a second portion of the multi-step collection and transmission process to collect a second subset of the user information in response to determining the first portion of the multi-step collection and transmission process is not sufficient to determine the user interaction indicator associated with the delay in the processing the transaction.

* * * * *